E. C. NEWCOMB.
AXLE CONSTRUCTION.
APPLICATION FILED JUNE 30, 1919.
1,381,218.
Patented June 14, 1921.
2 SHEETS—SHEET 1.
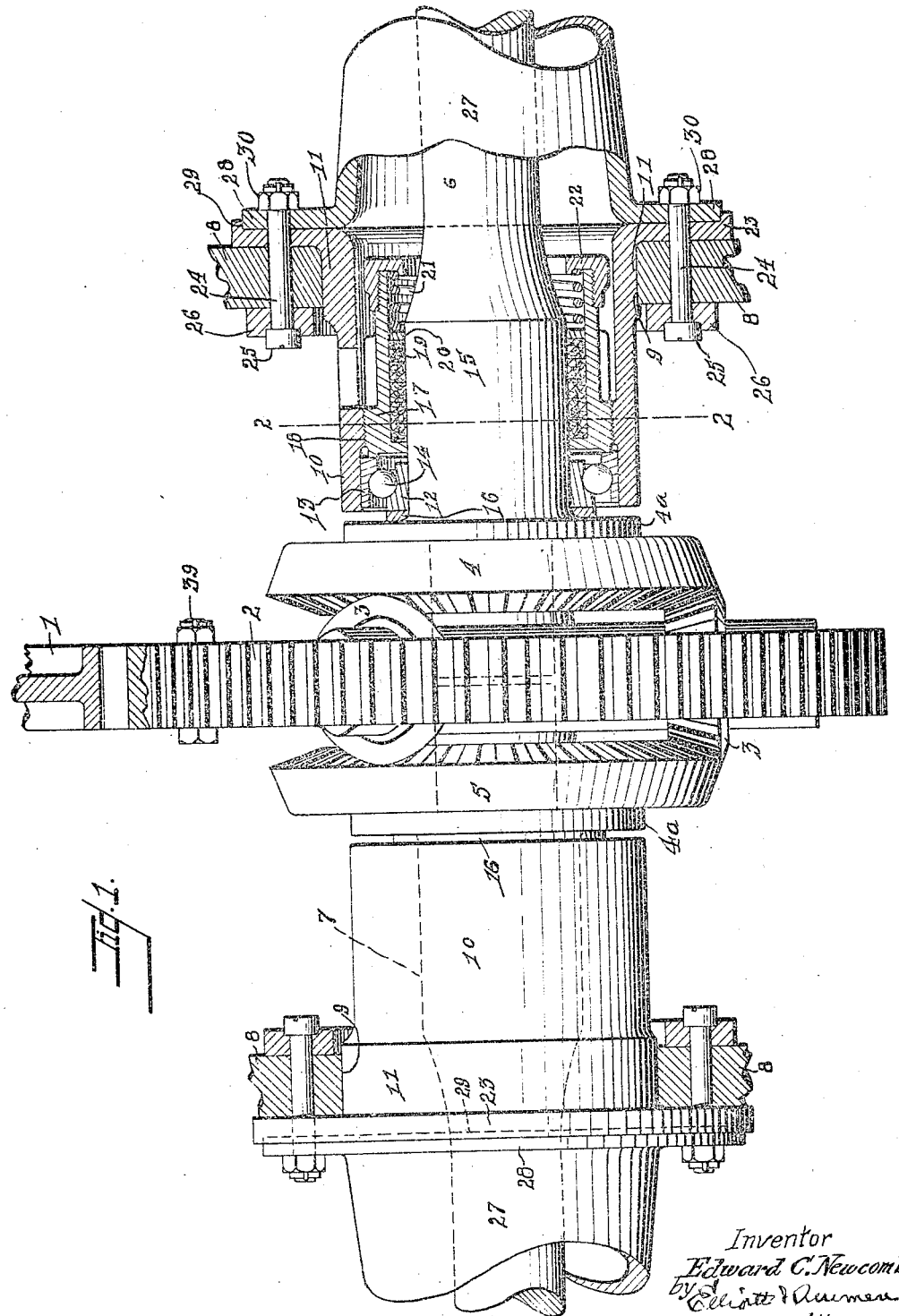

E. C. NEWCOMB.
AXLE CONSTRUCTION.
APPLICATION FILED JUNE 30, 1919.
1,381,218.
Patented June 14, 1921.
2 SHEETS—SHEET 2.
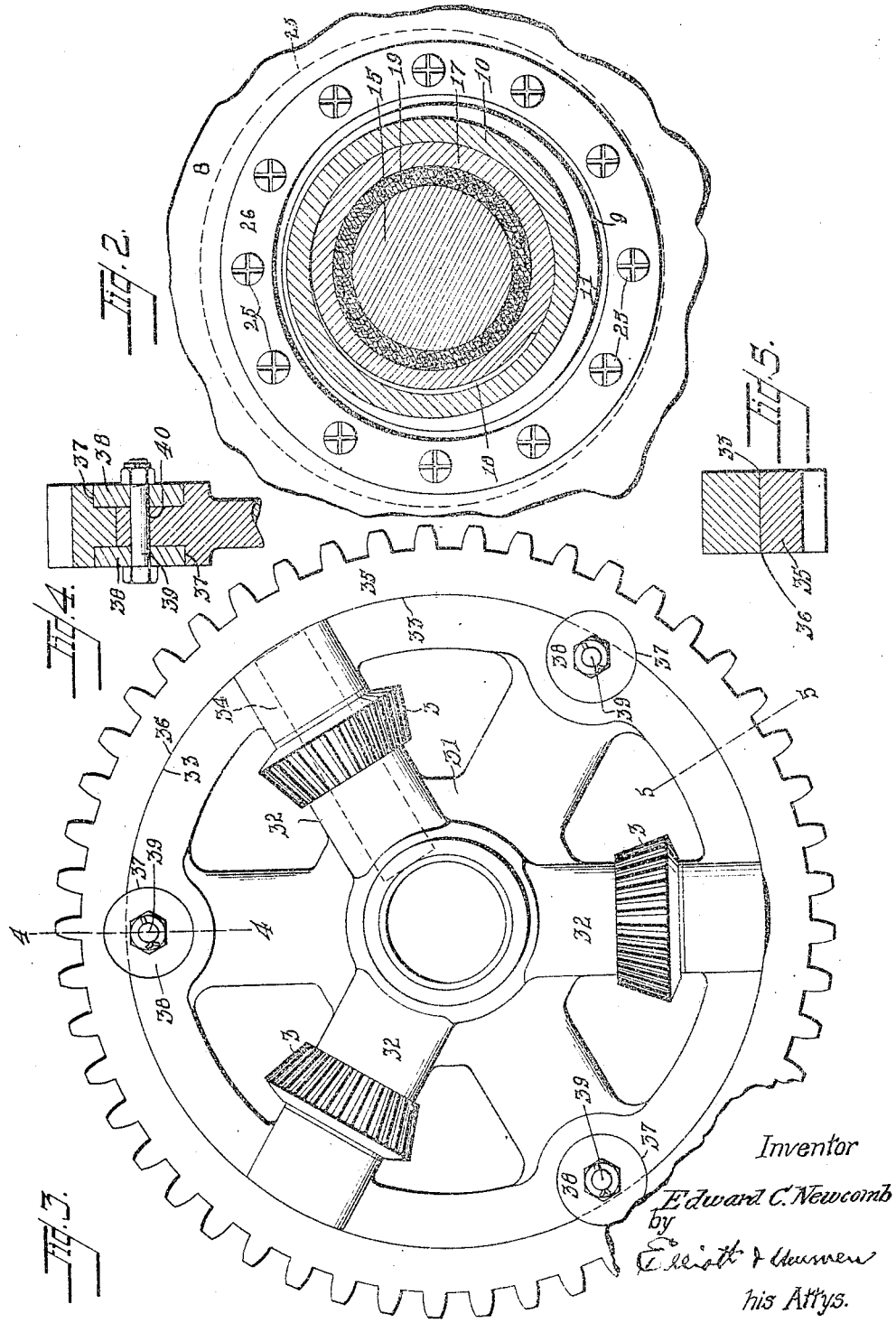

UNITED STATES PATENT OFFICE.

EDWARD C. NEWCOMB, OF SCITUATE, MASSACHUSETTS, ASSIGNOR TO STANDARD ENGINEERING COMPANY, OF ST. LOUIS, MISSOURI, A CORPORATION OF MISSOURI.

AXLE CONSTRUCTION.

1,381,218.  Specification of Letters Patent. Patented June 14, 1921.

Application filed June 30, 1919. Serial No. 307,697.

*To all whom it may concern:*

Be it known that I, EDWARD C. NEWCOMB, a citizen of the United States, residing in the town of Scituate and county of Plymouth and State of Massachusetts, have invented new and useful Improvements in Axle Construction, of which the following is a specification.

This invention relates to an axle construction for automobiles or other power-driven vehicles, and particularly concerns means for effecting an adjustment at the driving axle of a steam driven automobile. In this type of automobile the axle is usually driven through the medium of a driving gear-wheel which meshes with a driven member such as a differential gear wheel carried by the driven axle.

The general object of the invention is to provide simple means for effecting a very nice adjustment of mesh between the driven member or gear-wheel and the driving member or gear-wheel. The invention also concerns details of the construction of the axle and the driven gear wheel.

Further objects of the invention will appear hereinafter.

The invention consists in the novel features, and in the general combination of parts to be particularly described hereinafter, all of which contribute to produce a simple and efficient axle construction for automobiles. A preferred embodiment of my invention will be particularly described in the following specification, while the broad scope of my invention will be pointed out in the appended claims.

In the drawing, which fully illustrates a preferred embodiment of my invention,

Fig. 1 is a plan and partial section of the axle construction;

Fig. 2 is a cross-section taken on the line 2—2 of Fig. 1;

Fig. 3 is a side elevation of the differential gear-wheel partially broken away;

Fig. 4 is a section taken on the line 4—4 of Fig. 3; and

Fig. 5 is a typical section of the rim of the gear-wheel, taken on the line 5—5 of Fig. 3.

Referring more particularly to the parts, 1 represents a driving member, for example, a driving gear-wheel from which the axle is driven. Meshing with this driving member I provide a driven member, for example, a gear-wheel which is carried on the driven axle. In carrying out my invention, I provide for adjusting one or the other of these gears on an axis of rotation enabling it to be adjusted toward or from the other gear. In the present instance I mount the axle so that it is supported on an adjusting axis of rotation; by a slight rotation on this axis, the axle may be moved toward or from the driving member.

In effecting this result, I may employ a common type of differential drive, involving the use of a differential gear-wheel 2, which meshes with a driving gear-wheel 1, the differential gear-wheel being provided with a plurality of bevel driving pinions 3, the axes of which are disposed on radial lines in the usual manner, one side of each pinion meshing with a driven bevel gear-wheel 4, and the other side meshing with a similar bevel gear 5. The driving axle is formed in two sections consisting of a right hand axle member 6, and a left hand axle member 7, which members are not connected to each other but are attached rigidly to the bevel gears 4 and 5 respectively.

In order to provide a support for the axle, (axle members 6 and 7), I provide two oppositely disposed frame members 8. I provide a bearing corresponding to each frame member. Any suitable means may be provided for mounting these bearings on the frame, in such a way that they may be secured in a plurality of angularly adjusted positions about an axis of adjustment. The construction is duplicated at each side, with the driven gear-wheel 2 disposed midway between the two frame members. In the present instance I provide openings 9 in the frame, in each of which I mount a bearing member 10 which is in the form of a sleeve, said sleeve having an eccentric portion in the form of a neck 11 of slightly enlarged diameter which is of circular form and fits neatly in the opening 9. The bearings carry the axle so that its axis is eccentric to the axis of each opening 9. Each sleeve or bearing 10 extends toward the driven gear-wheel 2, and I prefer to provide bearing rings 12 and 13 at the inner end of the sleeve, which coöperate with balls 14 to form a ball-bearing. The bearing ring 12 seats on a neck 15 of enlarged diameter forming part of the axle member 6, the outer face of the bearing ring 12, seating against a washer 16 which lies against a collar 4ᵃ to which the bevel gear-wheel 4 is rigidly attached. The bearing ring 13 may be adjusted toward the gear-wheel 2 by means of an adjusting nut 17 of special construction, having a thread connection 18 with the bore of the sleeve 10, and this special nut has an integral bore to receive a packing material 19 operating as a dust ring and held in place by a follower in the form of a washer 20 which is pressed up by a spring 21, secured in place by a cap nut 22.

With the construction described, it is evident that the axis of the openings 9 constitute an axis of adjustment, so that a slight rotation of the bearings will adjust the axle toward or from the driving gear 1.

Suitable means is provided for securing the bearings against rotation in a plurality of angularly adjusted positions with respect to the bearing's axis of adjustment. To accomplish these effects, each bearing member 10 is preferably formed with a flange 23 on its outer end which seats against the outer face of the frame member 8, and through the medium of this flange, the bearing is secured to the frame. The means for securing the bearings against rotation is preferably in the form of a plurality of bolts 24 which are circumferentially placed about the axle, and these bolts are disposed equi-distant. In order to reinforce the construction at this point, I prefer to countersink the bolt heads 25 in a heavy reinforcing ring 26.

Axle housings are provided for enveloping the outer portions of the axle members. These housings are preferably detachably mounted on the bearings on seats that are concentric with the axis of the axle.

The axle members 6 and 7, beyond the frame members 10 are enveloped in suitable axle housings 27. Each axle housing may be held in place by any desired means, but preferably by the aforesaid bolts 24, for which purpose, the inner end of the housing is provided with a flange 28 which is detachably mounted on a seat 29 formed by a counter bore in the outer face of the flange 23.

In order to adjust the axle and the gear-wheel 2 toward or from the gear-wheel 1, it is simply necessary to remove the bolts 24 and give the bearings 10 a slight adjusting rotation in the openings 9, the rotation, of course, being at least through the angle separating two adjacent bolt holes. In this way, an adjustment is effected at the bearing, because the axis of each opening 9 operates as an adjusting axis of rotation. Having adjusted the gear-wheel 2 with nicety with respect to the gear-wheel 1, the bolts may be replaced and their nuts 30 reapplied to them. In making this adjustment, in building a new automobile, there is no necessity for changing the relative positions of the bearing 10 and the axle housing 27, and hence, the axle housing can be rotated with the bearing. In this connection, it should be remembered that the axis of the axle housing coincides with the axis of the bearing and the axle members 6 and 7, because the counterbores or housing seats 29 are concentric with the axis of the axle.

The bolt holes are all large enough to insure that the bolts can be inserted in any adjusted position of the bearing. If desired, the bolt circle on which the centers of the bolts 24 lie may be concentric to the opening 9. A slight defect of alinement may occur between the bolt-holes in the flange 23 and the bolt-holes in the frame member 8, but with the bolt-holes made as suggested, this is of no consequence.

Where an automobile already in use is to be adjusted it is not practicable to rotate the housing because of permanent connections already made on its outer end. In this case the housing is permitted to remain relatively fixed and I rotate only the bearing 10. Having adjusted the bearing, the housing 27 is then replaced on its seat 29; because the seat 29 is concentric with the axle member 6, it follows that the axle housing 27 will still maintain perfect co-axial alinement with the axle member 6 after the adjustment. In other words, it will have been adjusted forward or back with the axle, that is to say, toward or from the gear wheel 1. By making the bolt-holes in the flange 28 slightly oversize, as suggested above, any mal-alinement of the bolts will be taken care of, so that the bolts can readily be replaced. It is desirable to construct the differential gear-wheel 2 in such a way as to facilitate the ready replacement of the bevel pinions 3 in case they become broken or worn out; it is also desirable to construct this wheel so as to minimize the cost of repairs in case any of the peripheral teeth of this gear become broken.

In order to provide a wheel having both of these desirable qualities, I prefer to construct the differential gear-wheel 2 so that it comprises a body 31 having radially disposed tubular housings 32 which are cut away so as to receive the bevel pinions 3. The body 31 is formed with a circumferential or cylindrical outer face 33 through which face the radial openings are formed to permit the insertion of pins 34 which carry the pinions 3. The outer portion of the wheel is formed of a removable rim 35 carrying the gear teeth, and this rim has a cylindrical opening presenting a face 36 which fits over and against the cylindrical face 33 of the body of the wheel. Fig. 5 shows the preferred form of the typical section at the rim of this gear-wheel.

I provide means for locking the rim 35 to the body 31 to prevent lateral displacement of the rim and also to prevent a relative rotary movement taking place between the rim and the body of the gear wheel.

In order to accomplish this, I form recesses in the face of the wheel. These recesses are preferably of circular form such as the recesses 37, and each recess is formed partially in the body of the wheel and partially in the rim. Preferably a larger part of the recess is formed in the body of the wheel which avoids reducing the section of the rim as much as possible. These recesses may be formed in both side faces of the gear. In the recesses 37, I provide key-blocks in the form of disks 38 which fit nicely to the diameter of the recesses, and these key-blocks are secured in place by through-bolts 39 which pass through the centers of the disk and through openings 40 formed near the edge of the body of the wheel. Evidently this construction locks the rim securely to the body of the wheel, enabling the rim to be readily replaced when desired, and also renders the pinions readily removable.

It is understood that the embodiment of the invention described herein, is only one of the many embodiments my invention may take, and I do not wish to be limited in the practice of my invention, nor in my claims, to the particular embodiment set forth.

What I claim and desire to secure by Letters Patent is:

1. In an axle construction for automobiles, the combination of a driving gear-wheel, a frame, bearings mounted to rotate on said frame, an axle carrying a gear-wheel meshing with said driving gear-wheel, and supported to rotate in said bearings with its axis eccentric to said bearing axis, whereby a rotation of said bearings will adjust said axle toward or from said driving gear-wheel, and equi-distant bolts disposed circumferentially about said axle for securing said bearings to said frame.

2. In an axle construction for automobiles, the combination of a driving gear-wheel, a frame, bearings mounted to rotate on said frame, an axle carrying a gear-wheel meshing with said driving gear-wheel, and supported to rotate in said bearings with its axis eccentric to said bearing axis, whereby a rotation of said bearings will adjust said axle toward or from said driving gear-wheel, means for securing said bearings against rotation, and an axle housing carried by each of said bearings, so as to be moved bodily toward or from said driving gear wheel when said bearings are adjusted.

3. In an axle construction for automobiles, the combination of a driving gear-wheel, a frame, bearings mounted to rotate on said frame, an axle carrying a gear-wheel meshing with said driving gear-wheel, and supported to rotate in said bearings with its axis eccentric to said bearing axis, whereby a rotation of said bearings will adjust said axle toward or from said driving gear-wheel, means for securing said bearings against rotation, each of said bearings having an axle housing seat concentric with the axis of said axle, and an axle housing mounted on each of said housing seats so as to be moved bodily toward or from said driving gear wheel when said bearings are adjusted.

4. In an axle construction for automobiles, the combination of a driving gear-wheel, a frame, bearings mounted to rotate on said frame, an axle carrying a gear-wheel meshing with said driving gear-wheel, and supported to rotate in said bearings with its axis eccentric to said bearing axis, whereby a rotation of said bearings will adjust said axle toward or from said driving gear-wheel, said bearings each having an axle housing seat, an axle housing co-axial with the axis of said axle, mounted on each seat, said bearings being detachable from said axle housings to permit their rotation independently of said axle housings, said housing seats being concentric with the axis of said axle whereby the co-axial alinement of said axle and said housings is maintained after adjustment, and means for securing said bearings and axle housings to said frame.

5. In an axle construction for automobiles, the combination of a driving gear-wheel, a frame, bearings mounted to rotate on said frame, an axle carrying a gear-wheel meshing with said driving gear-wheel, and supported to rotate in said bearings with its axis eccentric to said bearing axis, whereby a rotation of said bearings will adjust said axle toward or from said driving gear-wheel, said bearings each having an axle housing seat, an axle housing co-axial with the axis of said axle, mounted on each seat, said bearings being detachable from said axle housings to permit their rotation independently of said axle housings, said housing seats being concentric with the axis of said axle whereby the co-axial alinement of said axle and said housings is maintained after adjustment, said bearings, said frame and said axle housings having equi-distant bolt-holes disposed circumferentially about said axle, and bolts for securing said bearings and said axle housings to said frame.

6. In an axle construction for automobiles, the combination of an axle, a gear-wheel carried by said axle, a frame having openings, bearings for said axle each having an eccentric neck mounted in one of said openings, a driving gear-wheel meshing with said first named gear-wheel, and means for securing said bearings in different rotatably adjusted positions in said openings to adjust said first named gear-wheel toward or from said driving gear-wheel, and axle housings attached to said bearings respectively and enveloping the said axle.

7. In an axle construction for automobiles, the combination of a pair of oppositely disposed frame members, a driving gear wheel disposed between the frame members, a bearing corresponding to each frame member, means for securing each bearing to its corresponding frame member in a plurality of angularly adjusted positions about an adjusting axis, an axle carrying a gear wheel meshing with said driving gear wheel and supported to rotate in said bearings on an axis, said adjusting axis being eccentric to the axis of rotation of said axle, whereby a rotation of said bearings on the axis of adjustment will adjust said axle toward or from the driving gear wheel, and an axle housing carried by each of said bearings and moved bodily toward or from the driving gear wheel when the bearings are adjusted.

8. In an axle construction for automobiles, the combination of oppositely disposed frame members, a driving gear wheel disposed between the frame members, a bearing sleeve attached to each frame member and projecting toward the plane of the gear wheel, means for securing each bearing sleeve to its corresponding frame member in a plurality of angularly adjusted positions about an axis of adjustment, an axle with a gear wheel meshing with the said driving gear wheel, bearing rings for rotatably supporting said axle, and located at the inner ends of the bearing sleeves, the said axis of adjustment being eccentric to the axis of rotation of the axle in the bearing rings whereby an adjusting rotation of said bearing sleeves will adjust the said axle toward or from the driving gear wheel, and an axle housing carried by each of said bearing sleeves and moved bodily toward or from the driving gear wheel when the bearing sleeves are adjusted.

In testimony whereof, I have hereunto set my hand.

EDWARD C. NEWCOMB.